(No Model.)

C. W. MILLS.
METALLIC PACKING FOR PISTON RODS.

No. 284,042. Patented Aug. 28, 1883.

Witnesses:
Phil C. Dietrich
Arthur E. Dowell

Inventor:
Chauncey W. Mills
by
J. M. Alexander
Attorney.

UNITED STATES PATENT OFFICE.

CHAUNCEY WALTER MILLS, OF ROCHESTER, NEW YORK.

METALLIC PACKING FOR PISTON-RODS.

SPECIFICATION forming part of Letters Patent No. 284,042, dated August 28, 1883.

Application filed April 30, 1883. (No model.)

*To all whom it may concern:*

Be it known that I, C. W. MILLS, of Rochester, in the county of Monroe and State of New York, have invented certain new and useful Improvements in Metallic Packing for Piston-Rods; and I do hereby declare that the following is a full, clear, and exact description thereof, reference being had to the accompanying drawings, and to the letters of reference marked thereon, which form part of this specification, in which—

Figure 1:
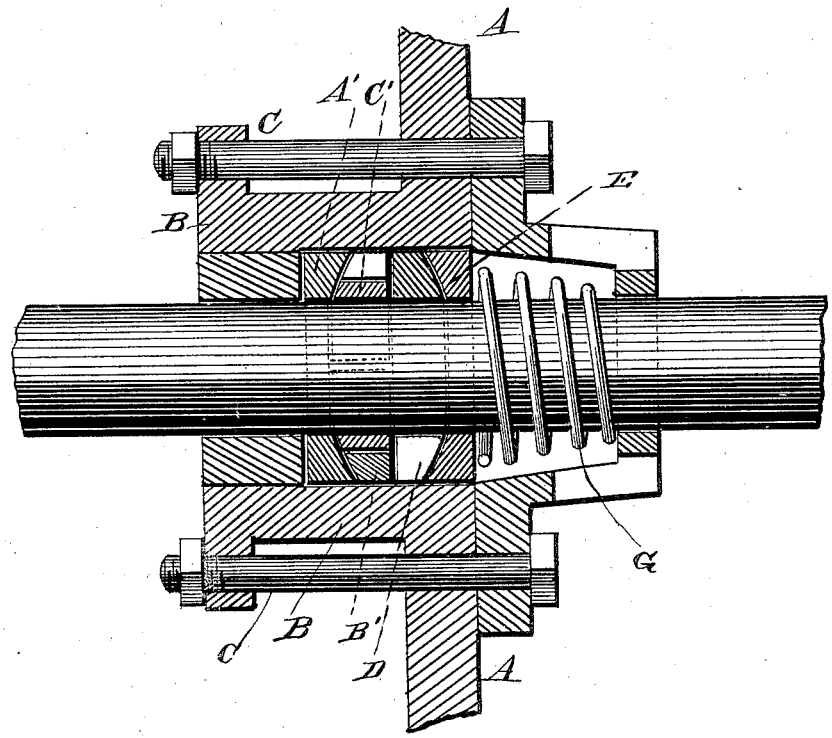
Figure 2:
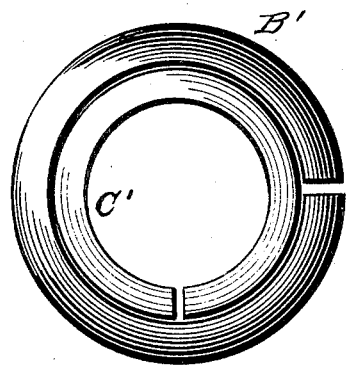

Figure 1 is a diametrical section through my improved piston-rod packing and a portion of a cylinder-head through which the piston passes. Fig. 2 is a face view of one of the split plano-convex rings and its internal split ring.

This invention relates to a metallic packing for piston-rods; and it consists in a certain combination of split rings, breaking joints, which will accommodate themselves to the piston-rod without binding and prevent leakage through the head and gland, as will be fully understood from the following description, when taken in connection with the annexed drawings.

A designates a portion of a cylinder-head, and B the stuffing-box thereof. The piston-head is constructed with an internal web or abutment, against which one portion of my packing bears. The opposite portion or end of the packing bears against a cap, which is held fast by means of screws C C and nuts.

The packing consists, essentially, of a number of split and solid rings constructed and combined in the following manner: The ring A′, which is next to the gland, is flat on one side and concave on the other side; in other words, it is a plano-concave ring adapted to afford a socket for a split ring, B′. This split ring B′ is plano-convex, and its convex side is a segment of a sphere adapted to the concave side of the ring A′, forming, practically, a ball-and-socket joint. Inside of this split ring is a secondary ring, C′, which is also split, and which breaks joints with the primary or outside ring, as shown in Fig. 2. This internal split ring, C′, is also plano-convex, and its convex side has the same radius as the external ring, B′.

D designates a split ring which is plano-convex, the plane side of which is in close relation to the plane side of the rings B′ C′. The convex surface of the split ring D impinges against the concave surface of a plano-concave ring, E, which, like the ring A′, is not split.

In practice I prefer to construct the rings A′ and E of a metal alloy and the rings B′, C′, and D of Babbitt metal.

G designates a helical spring, which is designed for keeping the rings in close contact at all times.

It will be seen from the above description that I have a packing for a piston or other rod playing through a stuffing-box, which packing will act automatically to prevent the escape of steam from the cylinder, and also accommodate itself to the vibration of the piston-rod or the valve-rod. It will also be seen that the ball-and-socket rings will operate to prevent oscillating movements of the piston-rod or the valve-rod. The split plano-convex ring C′, inside of the split plano-convex ring B′, breaking joints with each other and also with the split plano-convex ring D, will effectually prevent the escape of steam through the stuffing-box. The inside ring, C′, operates directly as a check to the steam, and as this ring is separate from the outer ring, B′, it may be made of Babbitt metal, while the outer ring may be made of spring-steel or other metal.

I am well aware that metallic split-ring packing for piston-rods is not new; neither is it new to use springs for compressing and holding split packing-rings together.

I am also aware that it is not broadly new to use in metallic piston-rod packing a plano-concave ring combined with a plano-convex ring in such manner that the rings will accommodate themselves to the vibrations of the piston-rod; and therefore I do not claim such devices.

Having thus fully described my invention, what I claim as new, and desire to secure by Letters Patent, is—

The combination of the plano-concave rings A' E, the split plano-convex rings B' and D, the split plano-convex ring C', inclosed by and breaking joints with the ring B', the pressure-spring G, and the stuffing-box inclosing the packing, all constructed and adapted to operate substantially in the manner and for the purposes described.

In testimony that I claim the foregoing as my own I affix my signature in presence of two witnesses.

CHAUNCEY WALTER MILLS.

Witnesses:
HARRAH J. REYNOLDS,
W. MARTIN JONES.